(12) United States Patent
McKemie et al.

(10) Patent No.: US 7,137,305 B2
(45) Date of Patent: Nov. 21, 2006

(54) STABILITY-ENHANCING ADMIXTURE AND IMPROVED BASE STABILIZATION PROCESS FOR USE IN ROADWAY CONSTRUCTION AND RECONSTRUCTION

(75) Inventors: R. Myles McKemie, Austin, TX (US); Dan R. Dipprey, Graham, TX (US); J. Mike Hemsley, Jr., Pearl, MS (US)

(73) Assignee: Ergen, Inc., Jackson, MS (US)

( * ) Notice: Subject to any disclaimer, the term of this patent is extended or adjusted under 35 U.S.C. 154(b) by 33 days.

(21) Appl. No.: 11/097,954

(22) Filed: Mar. 31, 2005

(65) Prior Publication Data

US 2005/0281616 A1    Dec. 22, 2005

Related U.S. Application Data

(62) Division of application No. 10/873,633, filed on Jun. 21, 2004.

(51) Int. Cl.
*G01N 3/00* (2006.01)
(52) U.S. Cl. ......................................................... 73/803
(58) Field of Classification Search .................. 73/803
See application file for complete search history.

(56) References Cited

U.S. PATENT DOCUMENTS

| | | | | |
|---|---|---|---|---|
| 3,924,408 A | * | 12/1975 | Beiswenger et al. | 60/290 |
| 4,069,181 A | * | 1/1978 | Healy et al. | 524/70 |
| 5,469,747 A | * | 11/1995 | Carlisle et al. | 73/861.355 |
| 6,820,641 B1 | * | 11/2004 | Larsen | 137/491 |
| 2004/0237656 A1 | * | 12/2004 | Itou | 73/714 |
| 2005/0011407 A1 | * | 1/2005 | Partanen | 106/277 |

* cited by examiner

*Primary Examiner*—Max Noori
(74) *Attorney, Agent, or Firm*—Gehrke & Associates, SC; Lisa M. Gehrke

(57) ABSTRACT

The present invention provides a process for stabilizing the base course of a roadway through steps including admixing an asphalt emulsion and Portland cement with granulated base materials. The base course formed through this process is stronger and less permeable than base materials stabilized with either Portland cement or an asphalt emulsion alone. The method of base stabilization includes the steps of evaluating the base materials, designing a proportional mixture of the base materials and stabilizing agents, and forming a stabilized base course.

9 Claims, No Drawings

STABILITY-ENHANCING ADMIXTURE AND IMPROVED BASE STABILIZATION PROCESS FOR USE IN ROADWAY CONSTRUCTION AND RECONSTRUCTION

CROSS-REFERENCE TO RELATED APPLICATION

This application is a divisional of and claims priority to U.S. application Ser. No. 10/873,633, filed Jun. 21, 2004.

BACKGROUND OF THE INVENTION

The present invention is directed to a method of base stabilization for use in the construction or reconstruction of roadways. More specifically, the present invention is directed to an improved method of increasing the strength and decreasing the permeability of the base course of a roadway through the addition of a unique combination of stabilizers to base materials.

A roadway is typically formed of at least four distinct courses, a subbase course, a base course, a binder course, and a surface course. Each of these courses serves a distinct and important role in the overall stability and durability of the roadway.

Stability, as used in the roadway construction industry, refers to the ability of a roadway or asphalt paving composition to resist deformation from imposed loads. If the materials needed for the roadway construction do not provide enough "stability" to satisfy the roadway design requirements, the materials may be modified with specific stabilizing agents to enhance certain qualities, such as strength and flexibility, or to decrease other qualities, such as permeability.

A specific stabilizing agent or "stabilizer" is selected to enhance a specific property. For example, stabilizers such as fly ash, Portland cement, and lime are known to increase the strength of pavement materials. Accordingly, these stabilizers are commonly added when additional strength is need.

Similarly, stabilizers such as asphalt emulsion are known to increase the flexibility and decrease the permeability of pavement materials. Accordingly, these stabilizers are used when increased flexibility or decreased permeability is desired.

The base course of a roadway, which is formed between the subbase course and the pavement course, is designed to provide strength and support to the roadway structure. The base course is typically formed of crushed stone, slag or similar materials and may include both a subgrade layer and a pavement base layer. If the base materials do not provide enough strength to accommodate the desired roadway design, the base materials are modified with stabilizers such as fly ash and Portland cement, to enhance their overall strength.

Unfortunately, a stabilizer such as asphalt emulsion, which is known to increased flexibility and decreased permeability of pavement materials, is as also understood to reduce the strength of these materials. Therefore, although asphalt emulsion is typically used to stabilize the pavement course, binder course and even a black base layer, it is not used in the stabilization of a base course layer.

SUMMARY OF THE INVENTION

The present invention provides a method of increasing the strength and decreasing the permeability of base materials during a base stabilization process. More specifically, the method includes the steps of admixing an asphalt emulsion and Portland cement into base materials to form a stabilized base course that is unexpectedly stronger and less permeable than a base course formed with base materials stabilized with either Portland cement or an asphalt emulsion alone.

The present invention further provides an improved base stabilization process for use in the construction or reconstruction of a roadway. This improved process, reduces the overall time and cost of roadway construction by reducing the number of steps and amount of pavement materials needed to complete the roadway.

Since the desired thickness of a pavement course is largely determined by the overall strength of the base course supporting it, the increased strength of the base course provided by the method of the present invention allows a corresponding decrease in necessary thickness of the pavement course formed atop the base course to achieve the same roadway strength and durability as determined in the original roadway design. Furthermore, the increase in base course strength may also reduce or eliminate the need for a additional supporting or strengthening layer, such as a black base layer, that would have been needed to enhance the strength of the base course.

These and other aspects of the present invention will be better appreciated and understood when considered in conjunction with the following description. It should be understood, however, that the following description while indicating the preferred embodiments of the present invention and numerous specific details thereof, is given by way of illustration and not of limitation. Many changes and modifications may be made within the scope of the present invention without departing from the spirit thereof, and the invention includes all such modifications.

DETAILED DESCRIPTION OF THE OF THE PREFERRED EMBODIMENTS

The present invention and various features and advantageous details thereof are explained more fully with reference to the nonlimiting embodiments that are detailed in the following description. Description of well-known components and process techniques are omitted so as not to unnecessarily obscure the present invention in detail.

The present invention provides a process for stabilizing the base course of a roadway through steps including admixing an asphalt emulsion and Portland cement with base materials. The base course formed through this process is stronger and less permeable than base materials stabilized with either Portland cement or an asphalt emulsion alone.

The base stabilization process includes the steps of evaluating the base materials, designing a proportional mixture of the base materials and stabilizing agents, and forming a stabilized base course.

The term "base materials" refers to materials such as crushed stone, slag, soil, crumb Hot Mix Asphalt (HMA) or similar materials, which are used to form the base course. An evaluation of the base materials determines the condition of these materials and whether they need to be stabilized. The results of a Unit Weight Test of each base material samples submitted for design allows for the proper proportioning of the base materials to meet the requirements set forth in the construction plans or the specific job requirements. Further evaluations include, examining the condition and thickness of any existing pavement, determining the type of base material under any existing pavement, determining the type of base material for use in new construction and determining the plasticity index of base materials.

After construction plans are finalized and the base materials have been evaluated, a proportional admixture of the base materials, Portland cement and asphalt emulsion is designed to achieve the strength and permeability requirements set forth in the construction specifications. Additional samples of the base materials are then obtained through common construction techniques. These samples of base material are pulverized or crushed to the desired size or gradation to be used during the actual construction process. If any inconsistencies or variations in the base materials exist in the area to be stabilized, samples are taken from each of these areas and incorporated into a refined mixture design.

The unit weight is then calculated for the base materials, Portland cement and asphalt emulsion in accordance with the proportional mixture. Samples of the stabilized base course material are then formed through the process including the following steps.

The base materials are granulated and then added to a mixing vessel and dry mixed in the proper predetermined proportions, as determined by unit weight. The Portland cement and asphalt emulsion stabilizers are then added to the granulated base material. No specific order of addition is required. The Portland cement may be added to the base material before the addition of the asphalt emulsion, after the addition of the asphalt emulsion or simultaneously with the addition of the asphalt emulsion. Preferably however, the Portland cement is added to the base materials before the addition of the asphalt emulsion as described below.

More specifically, the Portland cement is added to the granulated base materials and dry mixed at the appropriate rate for the specific sample requirement. The resulting admixture contains between approximately 1.0% and approximately 12.0% of Portland cement by weight of the granulated base materials. Preferably, the admixture contains between approximately 3.0% and approximately 10.0% of Portland cement by weight of the granulated base material and most preferably, the admixture contains between approximately 4.0% and approximately 8.0% by weight of the granulated base material. Water may be added if needed for compaction of the admixture.

The admixture is further stabilized with the addition of an asphalt emulsion at a rate predetermined in the mixture design. The resulting admixture contains between approximately 0.5% and approximately 6.0% of an asphalt emulsion by weight of the granulated base materials, preferably, between approximately 0.75% and approximately 4.0% of an asphalt emulsion by weight of the granulated base materials and, most preferably, between approximately 1.0% and approximately 3.0% of an asphalt emulsion by weight of the granulated base materials.

The Portland cement added to the base material may be any type of Portland cement used in general construction practices.

The asphalt emulsion added to the base material may be any asphalt emulsion containing at least one asphalt, at least one emulsifier and water. The asphalt emulsion includes between approximately 50.0% and approximately 70.0% of asphalt solids, by weight, and between approximately 0.3% and approximately 6.0% of emulsifier, by weight. In addition, other additives such as diesel fuel, kerosene, hydrochloric acid, soap, processing oils and other polymers such as latex, may also be added.

The asphalt solid used in the formation of the asphalt emulsion is selected from any standard asphalt source that is acceptable for paving applications and emulsification such as, 150-pen asphalt and #2 Diesel, and preferably asphalt solids in the range of an AC1 to an AC40, their Performance Graded equivalents or combinations thereof.

The emulsifiers used in the formation of the asphalt emulsion may be anionic, cationic or nonionic. Examples of acceptable emulsifiers include, but are not limited to, Telcodinac L, Telcodinac R, Indulin® SAL, Indulin® SBT, AA-57, Redicote® E4868, Indulin® W-5, Redicote® E-7000, Redicote® E7550, ARRMuls 3021, Redicote® E62, Optemul 80, ARRMuls 5011, DF-60, Redicote® 6870, Vinsol, NVX, Indulin® C, Indulin® ISC, BioTerg PAS-8s, CALSUD 81, D40T, Molex® RB-2, Emco LD-95, M28B, Indulin® 206, Crude Tall Oil, Redicote® E-47, Redicote® E-11, Redicote® E-5, TE9, AA-56, AA-75, AA-54, Redicote® E-4819, AA-78, DF-62, DF6310, Redicote® E-9190, Redicote® E-346, Pchem TeT, Redicote® D-152, Redicote® E-9, Redicote® E-64R, Redicote® E-9, Redicote® E-9A, Redicote® C-404, Redicote® C-450, Redicote® C-471, Redicote® E-47, Redicote® E-120, Indulin® ISE, Impact CP2, Indulin® W-1, Indulin® MQK, Indulin® MQK-1m, Indulin® MQK-2m, Indulin® QTS, Indulin® AMS, Indulin® AQS-1m and combinations thereof.

The properties of the asphalt emulsion may vary depending upon type and content of asphalt, but is preferably fluid at room temperature.

The asphalt emulsion is stored at temperatures below approximately 160° F. and above approximately 80° F. and used in cold mixing paving at temperatures between approximately 140° F. and approximately 60° F.

The whole batch of proportioned materials is then mixed until all ingredients are evenly dispersed and the stabilized admixture has a uniform consistency. The stabilized admixture is then quartered or split down to provide design samples (2–100 mm Marshall Samples, 3–150 mm Gyratory samples). The samples are then formed through compaction of the quartered or split down stabilized admixture following the final mixing process. If required, a Fog Seal shall be applied to the samples immediately after compaction and then placed into a Forced Draft Oven, maintaining a constant temperature of approximately 140° F. until constant mass is achieved.

The resulting stabilized granulated base materials are then tested for factors such as strength and permeability. Variations of the designed formulation are also tested through a 4×4 matrix. The matrix is set up to incorporate the expected best performing use levels of both the asphalt emulsion and Portland cement. Samples are prepared with variations in Portland cement levels and variations in asphalt emulsion levels. These variations are then compared in sixteen sample sets, which vary in strength and permeability.

The stability of each the resulting samples is tested through the following methods.

Two 100 mm Marshall Hammer compactor samples are formed from the stabilized base material. The 100 mm diameter Marshall Samples are compacted using 50 blows on 1 side of the sample. Paper release disks are applied to the top and bottom of the sample for easy sample removal. The samples are removed from the compaction mold immediately after compaction. If needed, a fog seal is applied at the designated rate immediately after compaction and the sample is then placed into the 140° F. oven. The Marshall Hammer samples will be between approximately 50 mm and 75 mm in height. The Marshall samples are measured for Indirect Tensile Compression by use of the TSR Lottman breaking head.

In addition, three 150 mm Gyratory compactor samples are formed from the stabilized base material. The 150 mm diameter Gyratory samples are compacted using a Super- Pave Gyratory Compactor (SGC). The sample is placed in a 150 mm diameter mold and compacted to 40 gyrations. The angle of gyration is 1.25° and the ram pressure is 600 kPa. Paper release disks are applied to the top and bottom of the sample for easy sample removal. The samples are removed from the compaction mold immediately after compaction. If needed, a fog seal is applied at the designated rate immediately after compaction and the sample is then placed into the 140° F. oven. The Gyratory sample will be between 65 mm and 95 mm in height. One of the Gyratory samples is used to determine permeability of the stabilized soil sample through 600 seconds using a HMA comparison permeameter. The second Gyratory sample is tested using a raveling test. The third Gyratory sample is tested for Indirect Tensile Compression by use of the TSR Lottman breaking head.

The strength of the samples is tested through an Indirect Tensile Compression test by use of the TSR Lottman Breaking Head on a 100 mm sample, tested dry at 40° C., and a 150 mm sample, tested dry at 40° C. In addition, a raveling test may also be used to measure the ability of the compacted stabilized granular base material to resist abrasion or wear.

A permeability test, which determines the strength of the finished granular base, its resistance to wear, and its resistance to moisture intrusion into the granular base layer, is also conducted.

Prior to the commencement of testing, the Core-Lok Bulk Gravity of each sample is determined to ensure a proper sample density has been achieved. This data is used for comparison purposes only and is to compare a sample sets density to another sample set density in the same testing matrix. This test is preformed on the samples after they have reached constant weight. Removing a sample from the 140° F. oven, measuring the samples mass, placing it back into the 140° F. oven for 2 hours and then measuring the samples mass again after the two-hour period determine constant weight. The difference in weight is then determined and if the percent change is less than 0.05% during that 2-hour period, constant mass has been achieved. After constant mass has been reached, the samples are removed from the oven and placed at ambient/room temperature for 12 to 24 hours to cool. After cooling the Core-Lok Bulk Gravity is measured and testing is then begun.

Indirect Tensile Compression tests by use of the TSR Lottman Breaking Head are conducted on both a 100 mm sample at a dry 40° C. and a 150 mm sample at a dry at 40° C. These tests measure the overall strength of the stabilized granular base material. The sample flow, recorded during the breaking of the sample, can also be reviewed and compared.

The Raveling Test may also be used to determine the ability of the compacted stabilized granular base material to resist abrasion or wear before the material is covered with a conventional type pavement. The raveling test is conducted on a 150 mm gyratory sample and is conducted as follows.

A sample is placed into a retaining device after it has reached constant weight and the CoreLok Bulk Gravity has been measured. An abrasion head is then installed onto a Hobart mixer and placed in contact with the compacted sample. The test is then conducted for a continuous 15-minute period and the amount of mass loss is recorded and then reported as percent mass loss.

The Permeability test, conducted on a 150 mm gyratory sample, measures the ability of the stabilized granular base material to resist the movement of water into and out of the stabilized granular base material. The Permeability test is run for 600 seconds on a HMA Permeability Tester.

The Permeability test is conducted as follows. A 150 mm diameter gyratory sample is place on the lower platform of the permeameter. A metal sleeve, containing a sealed rubber membrane is placed around the sample and lower platform and fitted so that it is securely in place. An upper platform is then positioned on top of the sample and inside of the metal sleeve with the rubber membrane. The upper platform has a graduated cylinder mounted securely in its top. The upper platform is then tightened with clamping bolts to compress the seals and the apparatus is then filled with water. After the apparatus is filled with water, a positive pressure is exerted on the rubber membrane and held at an air pressure between 6 psi and 14 psi. All air bubbles are allowed to escape before the testing is begun. A watermark at the top of the graduated cylinder is noted and the water drain valve is opened and timer is started. The duration of the test is 600 seconds or the amount of time taken to drain 500 cc of water. The permeability of the sample is then determined by calculating the amount of water permeating the sample per second.

Testing of the base materials stabilized through the combination of Portland cement and an asphalt emulsion displayed superior strength and less permeability as compared to base materials stabilized with either Portland cement or asphalt emulsion alone.

For example, as shown in Table 1 below, the addition of an asphalt emulsion to a base material can slow the water travel through the sample, thus reducing the volume traveling through the sample.

TABLE 1

Permeability of Stabilized Base Material cc/600 sec

| % Portland Cement | Asphalt Emulsion in gallons per yd$^2$ | | |
| --- | --- | --- | --- |
| | 0 | 1.25 | 1.5 |
| 0 | 16 | 16 | 24 |

On the other hand, the addition of an asphalt emulsion to the base material actually decreased the strength of the stabilized base material as show in Table 2 below.

TABLE 2

Strength of 150 mm Stabilized Base Material

| % Portland Cement | Asphalt emulsion in gallons per yd$^2$ | | |
| --- | --- | --- | --- |
| | 0 | 1.25 | 1.5 |
| 0 | 1550 | 1650 | 1300 |

This finding is consistent with the conventional understanding that the addition of an asphalt emulsion will reduce the strength of the resulting base materials.

The although the addition of Portland cement was found to increase the overall strength of the resulting base materials as shown below in Table 3,

TABLE 3

Strength of 150 mm Stabilized Base Material

| | % Portland Cement added to Base material | | | |
| --- | --- | --- | --- | --- |
| | 0 | 3 | 5 | 7 |
| 0 gallon per yd$^2$ Asphalt Emulsion | 1550 | 2850 | 3350 | 3150 | it also increased the permeability of the stabilized base material as shown in Table 4 below.

TABLE 4

Permeability of Stabilized Base Material cc/sec

| | % Portland cement added to Base material | | | |
|---|---|---|---|---|
| | 0 | 3 | 5 | 7 |
| 0 gallon per yd² Asphalt Emulsion | 16 | 24 | 48 | 48 |

The combination of Portland cement and an asphalt emulsion however, unexpectedly improved the overall stability of the base material by both increasing the strength and decreasing the permeability of the stabilized base material. As shown in Table 5 below, the combination of asphalt emulsion with Portland cement significantly decreases the permeability of the stabilized base material as compared to the base materials stabilized with either an asphalt emulsion or Portland cement alone.

TABLE 5

Permeability of Stabilized Base Material cc/sec

| % Portland Cement | 0 gal Asphalt Emulsion/yd² | 1.25 gal Asphalt Emulsion/yd² | 1.5 gal Asphalt Emulsion/yd² |
|---|---|---|---|
| 0 | 16 | 16 | 24 |
| 3 | 24 | 16 | 16 |
| 5 | 48 | 0 | 24 |
| 7 | 48 | 8 | 8 |

For example, the permeability of stabilized base material formed with 1.25 gallons per yd² of an asphalt emulsion and 5.0% Portland cement is 0.0 cc/600 seconds as compared to the permeability of a base material formed with 1.25 gallons per yd² of an asphalt emulsion and 0.0% Portland cement which is 16.0 cc/600 seconds. Furthermore, the permeability of a base material formed with 0.0 gallons per yd² of an asphalt emulsion and 5.0% Portland cement is 48.0 cc/600 seconds, which is significantly higher than the permeability of 0.0 cc/600 seconds discussed above.

Likewise, the strength of the base material stabilized with a combination of an asphalt emulsion and Portland cement displays superior strength as compared to base materials stabilized with either Portland cement or an asphalt emulsion alone. For example, as shown in Table 6 below, the strength of stabilized base material formed with 1.25 gallons per yd² of an asphalt emulsion and 5.0% Portland cement is 4250 as compared to the strength of a base material formed with 1.25 gallons per yd² of an asphalt emulsion and 0.0% Portland cement is which is 1650. Furthermore, the strength of a base material formed with 0.0 gallons per yd² of an asphalt emulsion and 5.0% Portland cement is 3350, which is significantly less than the strength of 4250 resulting from the combination as discussed above.

TABLE 6

Strength of 150 mm Stabilized Base Material

| Gallon per yd² Asphalt Emulsion | 0% Portland Cement | 3% Portland Cement | 5% Portland Cement | 7% Portland Cement |
|---|---|---|---|---|
| 0 | 1550 | 2850 | 3350 | 3150 |
| 1.25 | 1650 | 3000 | 4250 | 4550 |
| 1.5 | 1300 | 2300 | 4000 | 5600 |

Before the stabilized formulation is used in the construction or reconstruction of a roadway, the project specifications will be reviewed and all components reevaluated. If any significant deviations are found, samples will be resubmitted for another proportioning mixture design. The construction site will be cleared of all vegetation and debris.

If HMA pavement is present, the thickness of that HMA pavement shall be determined to be in accordance with the original plans. Any variations in the thickness of the HMA pavement may require the HMA pavement to be milled to the specified thickness.

The stabilized base course is then formed through the following steps. The Portland cement is applied at the appropriate rate by windrow in the area to the roadway site. A self propelled recycler/stabilizer is used to grind/granulate any HMA pavement down to the specified depth in the underlying soil or base material. If the specified plans require the addition of extra base materials, these materials are added in a windrow as the Portland cement is added. Pre-grinding or pulverization of the base materials may be needed to achieve optimum base material particle size.

An asphalt emulsion is then admixed into the granulated base materials after the addition of the Portland cement. This asphalt emulsion addition may be done either at the time the Portland cement is initially blended into the base material or through an additional pass of the recycler/stabilizer. The asphalt emulsion may be sprayed unto the granulated base materials and Portland cement with a metered spray bar and/or added in the mixing/grinding chamber of the recycler/stabilizer machine.

A water truck equipped with a metered spray bar then travels across the granulated base material admixture and applies the appropriate amount of water to gain sufficient compaction of the material. If it is deemed necessary the recycler/stabilizer machine may make another pass to fully incorporate the added water to gain proper compaction throughout the stabilized granulated base. After the material is fully prepared, the stabilized granulated base is then compacted by compaction equipment until the appropriate density is achieved.

All the disclosed features of each disclosed embodiment can be combined with, or substituted for, the disclosed features of every other disclosed embodiment except where such features are mutually exclusive. It is intended that the appended claims cover all such additions, modifications and rearrangements. Expedient embodiments of the present invention are differentiated by the appended subclaims.

What is claimed is:

1. A method of improving base course stability during construction of a roadway comprising the steps of:
   evaluating the base materials;
   designing a proportional mixture of the base materials, Portland cement and an asphalt emulsion; and,
   forming a stabilized base course through the addition of granulated base material to a predetermined amount of Portland cement and a predetermined amount of asphalt emulsion.

2. The method of claim 1, wherein the predetermined amount of Portland cement is between approximately 1.0% and approximately 12.0% of Portland cement by weight of the granulated base materials.

3. The method of claim 1, wherein approximately 3.0% and approximately 10.0% of Portland cement by weight of the granulated base material.

4. The method of claim 1, wherein the predetermined amount of Portland cement is between approximately 4.0% and approximately 8.0% by weight of the granulated base material.

5. The method of claim 1, wherein the predetermined amount of an asphalt emulsion is between approximately 0.5% and approximately 6.0% of by weight of the granulated base materials.

6. The method of claim 1, wherein the predetermined amount of an asphalt emulsion is between approximately 0.75% and approximately 4.0% of an asphalt emulsion by weight of the granulated base materials.

7. The method of claim 1, wherein the predetermined amount of an asphalt emulsion is between approximately 1.0% and approximately 3.0% of an asphalt emulsion by weight of the granulated base materials.

8. The method of claim 1, wherein the asphalt emulsion includes between approximately 50.0% and approximately 70.0% of asphalt solids, by weight, and between approximately 0.3% and approximately 6.0% of emulsifier, by weight.

9. A method of making a stabilized base course during roadway construction comprising:

evaluating the base materials;

designing a proportiona mixture of the base materials, Portland cement and an asphalt emulsion that increases the strength of the base materials and decreasing the permeability of the stabilized base materials; and, forming a stabilized base course through combining granulated base material with a predetermined amount of Portland cement and a predetermined amount of asphalt emulsion.

* * * * *

UNITED STATES PATENT AND TRADEMARK OFFICE
CERTIFICATE OF CORRECTION

| | | |
|---|---|---|
| PATENT NO. | : 7,137,305 B2 | Page 1 of 1 |
| APPLICATION NO. | : 11/097954 | |
| DATED | : November 21, 2006 | |
| INVENTOR(S) | : McKemie et al. | |

It is certified that error appears in the above-identified patent and that said Letters Patent is hereby corrected as shown below:

On the title page item (73), the Assignee is misspelled. Please change "Ergen, Inc." to Ergon, Inc.

Signed and Sealed this

Twenty-seventh Day of May, 2008

JON W. DUDAS
*Director of the United States Patent and Trademark Office*